March 18, 1969  F. SCHLEGEL  3,433,551
TELESCOPIC OBJECTIVE FOR INFRARED RADIATION
Filed May 23, 1966
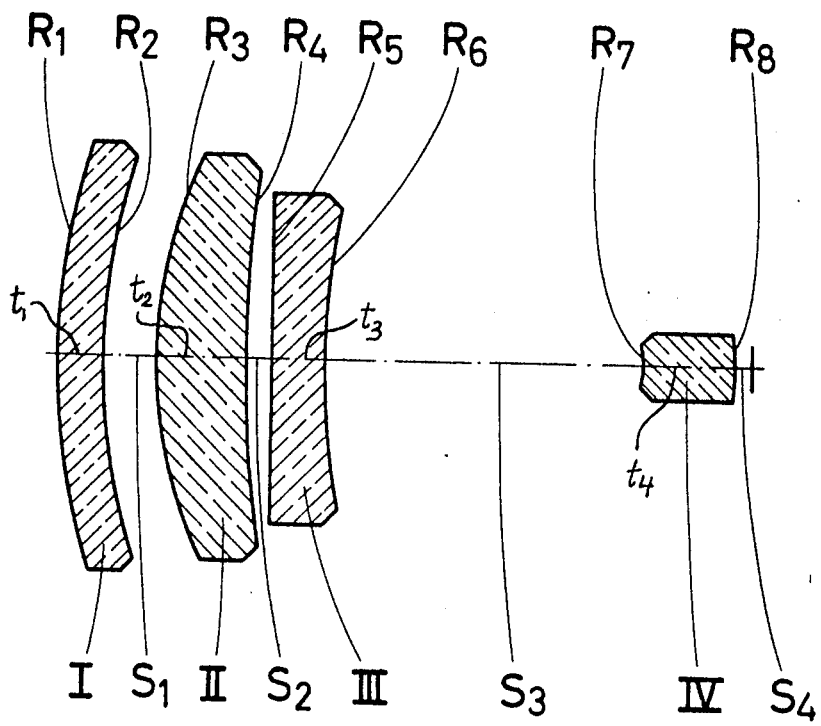
INVENTOR
Franz Schlegel
By: Low and Berman
Agents

United States Patent Office 3,433,551
Patented Mar. 18, 1969

3,433,551
TELESCOPIC OBJECTIVE FOR INFRARED RADIATION
Franz Schlegel, Munich, Germany, assignor to Optische Werke G. Rodenstock, Munich, Germany
Filed May 23, 1966, Ser. No. 551,986
Claims priority, application Germany, May 22, 1965, O 10,878
U.S. Cl. 350—2
Int. Cl. G02b 3/00
5 Claims

ABSTRACT OF THE DISCLOSURE

A telescopic objective for infrared photography having an aperture of better than 1:3 and a short working length consists of silicon and germanium lenses of which the first is a silicon meniscus lens substantially without refractive power followed by a divergent component including a convergent silicon meniscus lens and a divergent germanium meniscus lens. The last component is a single divergent germanium meniscus lens whose concave front surface spacedly faces a concave rear surface of the germanium lens in the preceding component.

---

This invention relates to infrared photography, and particularly to telescopic objectives transparent to infrared radiation.

The object of the invention is the provision of a telephoto objective essentially transparent to infrared radiation having a wavelength between approximately 3 and 8 nm., having an F-number of at least 1:3, but preferably 1:2.5 or better, being achromatic over the aforementioned range of infrared wavelength, and having a short working length, the term indicating the sum of the total length of the lens and the intercept length. A more specific object of the invention is the provision of a telephoto objective of the type described which has a working length of less than two thirds of its focal length, and preferably only 55 percent of its focal length.

The known achromatic objectives useful for the infrared range have an intercept length which is substantially equal to the focal length, as is common in conventional achromatic objectives consisting of two thin meniscus lenses.

The objective of the invention consists essentially of silicon and germanium lenses. The convergent lens is meniscus shaped and faces in the direction of the longer intercept length. It is made of silicon. It is followed by two divergent meniscus lenses of germanium which have opposite concave surfaces between which the lens diaphragm may be arranged.

A characteristic feature of the telescopic lens system of the invention is the magnitude of the air space which separates the converging component of the system from the diverging component, the converging component including the aforementioned converging meniscus lens and the adjacent diverging meniscus lens, and the diverging component being constituted by the divergent meniscus lens. This air space should be substantially greater than the spacing of the concave surface of the last-mentioned divergent meniscus lens from the focus of the objective on the image side, and is preferably about three times said spacing, or about 30 percent of the focal length. The concave surface of the last meniscus lens is the dominant constituent of the divergent component.

Extra-axial image errors are corrected effectively when the thickness of the last-mentioned meniscus lens is close to 9% of the focal length of the objective.

If the objective is to be used in field equipment, the objective should be protected by a meniscus lens without refracting power placed before the first convergent silicon lens of the objective proper, the protective lens also preferably being made of silicon.

A representative objective of the invention is illustrated in a conventional manner in the appended drawing which shows a four-lens system in axial section.

Lens I is the protective meniscus lens, lens II the convergent front element of the converging component of the objective. Lens III is the divergent element of the converging component, and lens IV constitutes the divergent component. Lenses I and II consist of silicon having an index of refraction of $n=3.42$ for a wavelength of 4.26 nm., and lenses III and IV consist of germanium having an index of refraction of 4.02 for the same wavelength.

The objective has a focal length of 100 millimeters and a speed of $f=1:1.5$. The thicknesses $t$, air spaces $s$, and radii R have the values tabulated below. The objective is achromatic over the range from 3 to 8 nm.

| Lens | Thickness | Air space | Radius |
|---|---|---|---|
| I | $t_1=4.6$ mm. | | $R_1=66.04$ mm. |
| | | $s_1=5.0$ mm. | $R_2=61.72$ mm. |
| II | $t_2=8.6$ mm. | | $R_3=41.60$ mm. |
| | | $s_2=2.05$ mm. | $R_4=118.6$ mm. |
| III | $t_3=4.9$ mm. | | $R_5=193.7$ mm. |
| | | $s_3=30.0$ mm. | $R_6=72.0$ mm. |
| IV | $t_4=9.3$ mm. | | $R_7=-7.92$ mm. |
| | | $s_4=1.48$ mm. | $R_8=-26.66$ mm. |

At least some of the advantages of this invention can be secured in objectives whose lenses do not substantially deviate from the values indicated above.

What is claimed is:
1. A telescopic objective for infrared radiation comprising in axial sequence:
   (a) a protective silicon meniscus lens constituting the first surface of said objective and being substantially without refracting power;
   (b) a convergent component including a convergent silicon meniscus lens and a divergent germanium meniscus lens; and
   (c) a divergent component consisting essentially of a single divergent germanium meniscus lens,
      (1) the concave surfaces of said divergent meniscus lenses facing each other at a spacing of approximately 30 percent of the focal length of said objective, and
      (2) the thickness of said single divergent germanium meniscus lens being approximately nine percent of said focal length.
2. An objective as set forth in claim 1, wherein said lenses are air-spaced along the optical axis of said objective, said convergent lens being the first lens of said convergent component, and said divergent lens of the convergent component being interposed between said convergent lens and said divergent component, and the thick- ness $t$ of said lenses, the air spaces $s$ separating the same, and the radii of curvature $R$ of the surfaces of said lenses being substantially as defined in the following table, $F$ being the focal length of said objective:

TABLE

| Lens | Thickness | Air space | Radius |
|---|---|---|---|
| Protective | $t_1=.046 F$ | | $R_1=.6604 F$ |
| | | $s_1=0.050 F$ | $R_2=.6172 F$ |
| Convergent silicon | $t_2=0.086 F$ | | $R_3=.4160 F$ |
| | | $s_2=.0205 F$ | $R_4=1.186 F$ |
| Divergent germanium | $t_3=0.049 F$ | | $R_5=1.937 F$ |
| | | $s_3=.300 F$ | $R_6=.720 F$ |
| Do | $t_4=.093 F$ | | $R_7=-.0792 F$ |
| | | | $R_8=-.2606 F$ |

3. An objective as set forth in claim 2, having an effective aperture corresponding at least to an F-number of 1:3.

4. An objective as set forth in claim 3, having an effective aperture corresponding to an F-number of 1:2.5.

5. An objective as set forth in claim 2, wherein the index of refraction of said silicon lenses is $n=3.42$, and the index of refraction of said germanium lenses is $n=4.02$, said indices of refraction being for infrared radiation having a wavelength of 4.26 nm.

References Cited

UNITED STATES PATENTS 3,321,264  5/1967  Sijgers et al. _____ 350—2

JOHN K. CORBIN, *Primary Examiner.*

U.S. Cl. X.R.

350—220